United States Patent [19]
Gibbs

[11] Patent Number: 5,597,196
[45] Date of Patent: Jan. 28, 1997

[54] AUTOMOBILE COVER DEPLOYMENT AND STORAGE SYSTEM

[76] Inventor: Edward R. Gibbs, 107 S. Gomez Ave., Tampa, Fla. 33615

[21] Appl. No.: 524,913

[22] Filed: Sep. 8, 1995

Related U.S. Application Data

[63] Continuation of Ser. No. 141,849, Oct. 22, 1993, abandoned.
[51] Int. Cl.⁶ ..................................................... B60J 11/00
[52] U.S. Cl. ..................... 296/98; 160/326; 160/370.22; 296/39.1; 296/136
[58] Field of Search ........................... 296/95.1, 98, 136, 296/39.1; 280/770; 160/370.2, 370.2 A, 370.2 B, 370.2 R, 323.1, 326, 903

[56] References Cited

U.S. PATENT DOCUMENTS

| | | | |
|---|---|---|---|
| 1,461,478 | 7/1923 | Daniels | 160/370.2 A X |
| 1,860,520 | 5/1932 | Zink | 296/39.1 X |
| 2,213,601 | 9/1940 | White | 296/98 |
| 4,834,446 | 5/1989 | Tung-Chow | 296/98 |
| 4,958,881 | 9/1990 | Piros | 296/98 |
| 5,129,678 | 7/1992 | Gurbacki | 280/770 |
| 5,176,421 | 1/1993 | Fasiska | 296/136 |

FOREIGN PATENT DOCUMENTS 4-208636  7/1992  Japan ..................................... 296/136

Primary Examiner—David M. Mitchell
Assistant Examiner—Kia M. Robinson

[57] ABSTRACT

A system for the deploying and storing of an automobile cover. The system is provided with a roller assembly which can be made to be pivotally disposed about the axis of an axle. Attached to the roller at one end and the axle at another end is a spring means. The roller assembly has attached to it a full body automobile cover. The cover having one end adapted to covering and being secured to the end of the automobile opposite from the trunk, and the other end attached to the roller. The cover wound around the roller assembly and the roller assembly is stored in the trunk compartment of the automobile. The cover can be easily unwound from and wound back onto the roller with the assistance of the spring biased roller. The operator can quickly deploy the cover by pulling it from the back of the trunk over the trunk lid, and over the car, securing it to front bumper. The trunk can be closed after the cover is secured to the front bumper, thus securing the system inside the trunk.

1 Claim, 3 Drawing Sheets

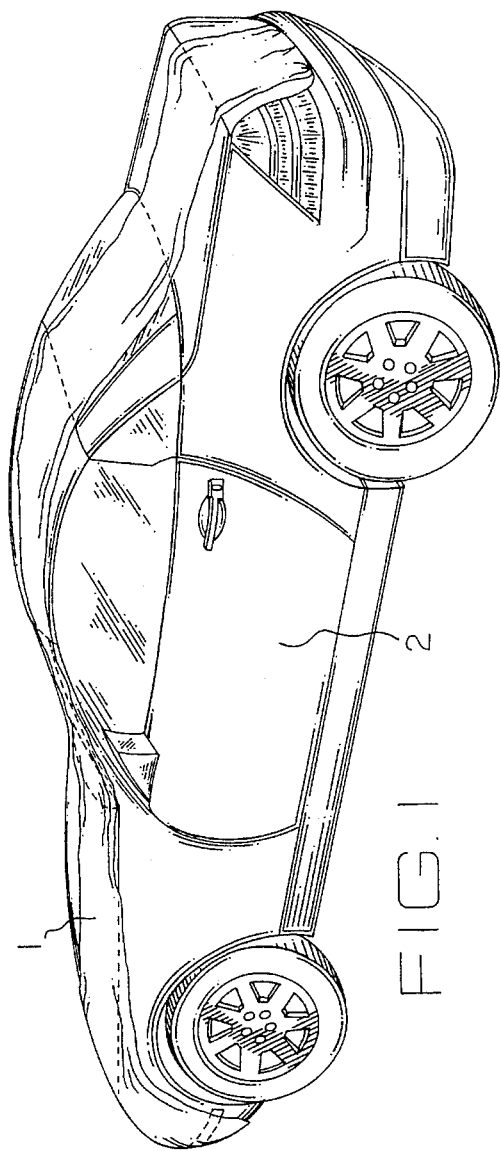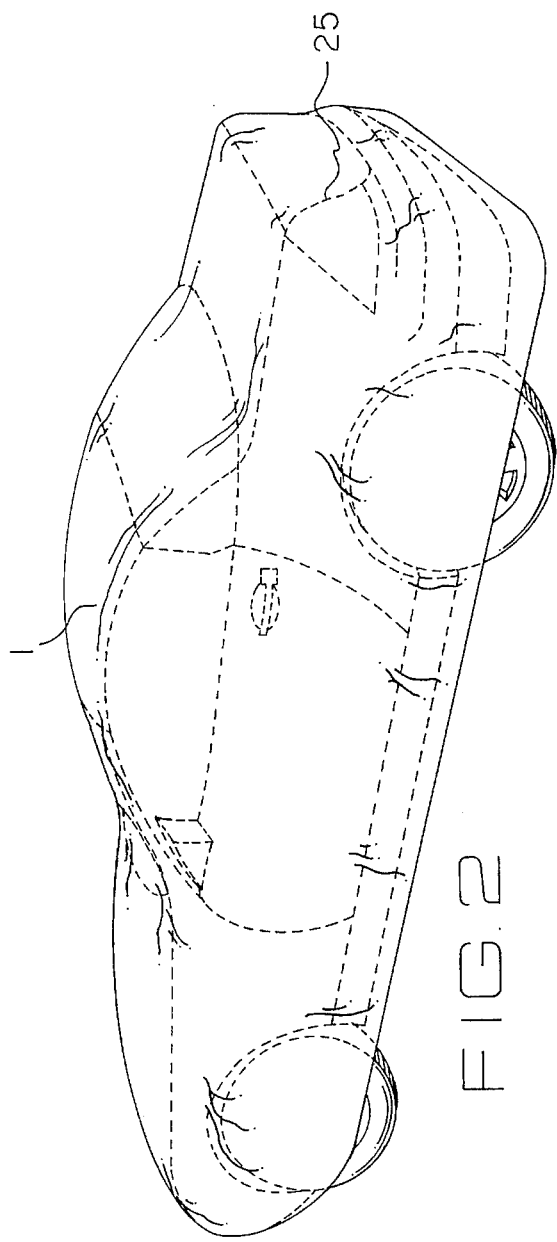

AUTOMOBILE COVER DEPLOYMENT AND STORAGE SYSTEM

This application is a continuation of application Ser. No. 08/141,849, filed Oct. 22, 1993, now abandoned.

BACKGROUND OF THE INVENTION

1. Field of the Invention

The present invention relates to an improved car cover deployment and storage system mounted in the trunk of an automobile. As the automobile cover, constructed of a flexible material, is drawn with tension from a spring-tensioned roller assembly, the rotation of a roller member relative to a fixed axle winds a spring means and creates a restoring torsional force that urges the roller to counter-rotate. The deployed cover can be wound back onto the roller member using the stored torsional force, and stored in the trunk of the automobile. The system makes use of the automobile trunk lid to guide the cover during deployment and retraction, and thus obviates the need for any guide rollers or separate housing or containment means. The trunk lid also closes over the cover, which renders the cover theft proof and eliminates the need for separate conventional means to secure the cover to the rear bumper. The system is thus lightweight, compact, economical to manufacture, and easy to install and operate.

The invention further concerns a system for mounting the deployment and storage system in the trunk of an automobile.

2. Description of the Related Art

It is not always possible to park an automobile in a garage or shaded parking area. Flexible car covers have become very popular automotive accessories and are used as temporary protection to preserve the paint and interior of an ungaraged parked car from the effects of harsh sunlight, dust, snow, rain, tree sap, bird droppings and the like. Further, car covers may also discourage theft and vandalism of the cars.

Car covers of this type are typically available in a wide variety of shapes and configurations ranging from, on the one hand, covers which are shaped to fit about a generic car configuration and drape the entire car, to, on the other hand, partial covers which extend only over the top section of the car (i.e., the hood, roof, windshields and trunk deck). Perhaps the most common variety of car covers are those which may be folded and carried in the trunk and then removed from the trunk, appropriately draped over the car and secured thereto by hooks, elastic, VELCRO hook-and-pile fastener tie-down means, or the like. While effective and conceptually simple, conventional car covers of this type have several well-known limitations and disadvantages.

For example, installation is awkward and time-consuming, and it can be fairly difficult for a single person to install and remove such a cover. Additionally, unless the cover is custom designed to precisely fit the contour of the particular car, the cover is often considerably oversized and tends to billow and flap in a stiff breeze despite the use of tie-down straps or the like. Moreover, car covers of this type, when in place over the car exterior, may be easily stolen.

Generally available covers which cover the entire body of the car are stored in a bag which is, in turn, stored within the trunk of the vehicle. To use, the cover must be removed from the bag, unfolded, oriented correctly, thrown or "floated" over the automobile, and stretched over anchoring points. Removal can be just as awkward, and requires bunching and stuffing of the car cover into the storage bag. Because this procedure involves significant time and effort on the part of the car owner, the car owner will often leave the car exposed, rather than struggling with the cover.

One approach to overcoming the inconvenience of the typical cover has been to store the flexible cover on a wind-up roll, of one sort or another, which is externally secured to the front or rear end of the car. From its rolled-up, stored position the flexible car cover can simply be unrolled toward the opposite end of the car and operatively secured over the car. Representative examples of this "roll-up" external over scheme may be found in U.S. Pat. No. 1,918,423 to Persinger; U.S. Pat. No. 3,222,102 to Lucas; U.S. Pat. No. 3,992,053 to Hrytzak et al; U.S. Pat. No. 4,432,581 to Guma; and U.S. Pat. No. 4,519,644 to Song, which disclose a framed, fold-out car cover housed in an external storage container secured to the rear bumper. Further variations on this theme have been proposed. U.S. Pat. No. 5,176,421 (Fasiska) teaches a flexible car cover having one end attached to a rotatable spool housed in a containment tube. The spool may be rotated by means of a pre-loaded spring, electric motor or manual crank. The tube is located in the trunk for storage, and is pivoted out of the trunk and towards the back bumper prior to applying the cover to the automobile. Such an arrangement has a number of deficiencies. First, since the spool and containment tube must be pivoted out of the trunk, there exists the danger of the tube impacting and damaging the finish or bodywork of the automobile. Further, as the cover is deployed from the containment tube, the tube will rub against the automobile, increasing the likelihood of damage. Finally, since the entire device must be pivoted out of the trunk, and thus left exposed during use, it degrades the appearance of the automobile and presents an easy target for thieves.

U.S. Pat. No. 4,925,234 (Park et al) discussed known "roll up" car covers, and their disadvantages. The disadvantages stated were large size, possibility of theft, need for mounting hardware, and cost. Park et al avoid these problems by completely omitting the roller used in rolling the cover on a roller. Instead, the cover is simply folded, accordion style, into the trunk. More specifically, Park et al teach a car cover having one end of the fabric of the car cover anchored in the trunk. To use, the trunk is opened, and the cover is unfolded and applied to the automobile. To store, the cover is folded longitudinally and stored in the trunk. By avoiding the use of rollers, Park et al illustrate the deficiencies in the state of the art roller type car covers.

U.S. Pat. No. 5,078,330 (Hall) teaches a battery powered electric motor driven rewinding and storing apparatus for flexible protective covers for vehicles. The device is stored in the trunk, and is pivoted out of the trunk and held in place on the bumper when in use.

U.S. Pat. No. 5,056,839 (Yooh) teaches a cover assembly comprising a case (which may be integral with the automobile bumper) having a rotary shaft in the case. The assembly appears to be complex, expensive, and incapable of after-market installation.

U.S. Pat. No. 5,086,988 (LaPointe et al) teaches a free-standing canister having a central axis about which a car cover can be wound, and an opening through which the cover can be deployed. The axle is rotated by applying pressure on a handle connected to the axle. To store the car cover, as the axle is rotated, the car cover is taken up about the axle. The canister is not permanently mounted inside the trunk of the automobile.

U.S. Pat. No. 5,029,933 (Gillem) teaches a cover which can be rolled up about itself (like a sleeping bag or bed-roll)

for storage inside the trunk of an automobile. For deployment, the trunk is opened, and the cover is pulled out from the space between the front of the trunk lid and the automobile body, i.e., between the hinges. No roller is used.

U.S. Pat. No. 4,720,135 teaches the use of a protective device including a protective sheet for covering the upper surface of the body of a motor vehicle. The sheet is anchored at one end to a winding roller which is fixed permanently to the vehicle in the region of one of its bumpers and is provided at its other end with means for attachment to the region of the other bumper. This protective device has many disadvantages. The protective device only covers the top of the car, leaving the sides exposed to dust and the elements. Likewise, since the doors and side windows of the vehicle are exposed, the protective device does little to discourage theft or vandalism. In fact, the system itself is exposed and in need of protection from theft. Finally, since the device is permanently mounted near the vehicle's bumper, it is apt to be damaged in a collision.

U.S. Pat. No. 4,732,421 (Ross et al) teach a self-storing, retractable automobile cover apparatus employing a constant force spiral spring. The apparatus includes a housing and rigid tubes acting as fixed roller guides for controlling the takeup of the cover onto the tubular reel. The apparatus is bulky, complex, and must be deployed on the rear bumper of an automobile for use.

U.S. Pat. No. 4,657,298 discloses another protective device for a car which includes a sheet of material wound around a roller and a surrounding container which is permanently mounted within the trunk of the vehicle. The sheet member is extended from the roller, passing upwardly through the gap between the front edge of the trunk lid and the body of the car, to cover the roof and hood of the vehicle. A motor is used to retract the sheet into the container for storage. This design is impractical in that the device is relatively large, heavy and expensive, and the cover leaves the sides and entire rear end of the car exposed to intruders and the elements. Further, the electric motor adds to the cost, weight, complexity and size of the device.

Another "roll-up" device is disclosed in U.S. Pat. No. 4,718,711 (Rabbit) in which the flexible car cover is stored on a double roller structure secured to the interior trunk hinges by elastic shock cords. When the cover is rolled onto the front storage roller both rollers may be stored in the trunk. This cover device necessitates providing complex roller structures and special mounting hardware.

U.S. Pat. No. 4,216,989 discloses a pop-up cover mechanism for covering the full body of the vehicle. The full cover is stored within a protective storage compartment which is mounted on the roof of a car. The storage compartment can be opened to release the protective sheet when it is desired to cover the car. An end of the protective sheet remains attached to the storage compartment, allowing the storage compartment to hold the protective sheet in place. While the device provides for a somewhat elaborate deployment mechanism, the device is permanently attached to the center of the roof of the car, forming a large raised block portion, which is aesthetically undesirable. Further, the device requires that the design of the vehicle itself be altered or, in one embodiment, that holes be drilled into the roof of the car in order to mount the storage compartment on the car. This device is relatively expensive and has not proved popular among car owners.

While the above mentioned patents are representative of the designs which have been developed to facilitate the more rapid and easier covering and uncovering of the parked car, they each clearly build in other problems, limitations and disadvantages. For example, the external mounting of a relatively bulky cover storage container on the front bumper, the rear bumper, or the trunk lid does little to enhance the overall appearance of the car. Such an apparatus is heavy, complex, expensive, and constantly exposed to the effects of the environment. Further, in an externally mounted system, the cover may accidentally deploy while the automobile is in motion, which can result in serious damage to the cover and/or automobile.

A system which is stored in the trunk but must be pivoted externally to the automobile in order for the cover to be deployed, requires special mounting hardware. Further, when the cover system hardware is positioned on the exterior of the car when in use, the possibility of theft is increased.

Moreover, most of the conventional cover structures discussed herein are comprised of a flexible sheet which, when in its operative position, covers the external trunk lock typically positioned in the center of the rear panel of the closed trunk lid. It is thus difficult to externally unlock the trunk without at least partially loosening the operatively positioned flexible cover.

In view of the foregoing, it is an object of the present invention to provide a flexible full-body protective automobile cover system which eliminates or minimizes the above-mentioned and other problems, limitations and disadvantages typically associated with conventional flexible automobile cover systems, and to provide an automobile cover deployment and storage system which is light, simple to manufacture, easy to install and use, inexpensive, reliable, compact and which does not detract from the aesthetic appearance of the vehicle.

SUMMARY OF THE INVENTION

After extensive investigation and experimentation, the present inventor has discovered that the objects of the invention can be simply, eloquently, and inexpensively accomplished by a housingless system for covering an automobile, said system comprising:

a roller assembly comprising a axle portion, a roller pivotally disposed about the axis of the axle, and a spring means attached at one end to the roller and at the other end to the axle, end plates for mounting to said automobile and adapted to receiving said roller assembly, and a full body automobile cover adapted to the automobile contour having a free first end adapted to covering and being secured to the end of the automobile opposite from said trunk, and a second end attached to said roller.

The automobile cover is constructed of a flexible material, is stored wound about the spring biased roller in the trunk compartment of a automobile, and can be easily unwound and wound back on the roller with the assistance of the spring biased roller. The automobile cover covers not only the top of the automobile, but also at least portions of the sides of the automobile. The owner is thus able to quickly and conveniently deploy a full body automobile cover from the trunk of the automobile, and to store it by means of, and with the assistance of, the storage device within the trunk of the automobile.

As a further advantage of the present invention, the system, when deployed over an automobile, is theft proof since the hardware is locked inside the trunk and the cover is trapped by the closed trunk. Further, the deployed cover is more aesthetically pleasing and does not detract from appearance as do most conventional automobile covers.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other automobile cover devices for carrying out the same purposes of the present invention. It should also be realized by those skilled in the art that such equivalent structures do not depart from the spirit and scope of the invention as set forth in the appended claims.

BRIEF DESCRIPTION OF THE DRAWING

For a fuller understanding of the nature and objects of the present invention reference should be made to the following detailed description taken in with the accompanying drawings in which:

FIG. 1 is a pictorial illustration in elevated perspective view showing the automobile cover partially deployed over an automobile.

FIG. 2 shows the same cover as is FIG. 1, fully deployed over the automobile and fastened in the back

DETAILED DESCRIPTION OF THE INVENTION

Figure 3:
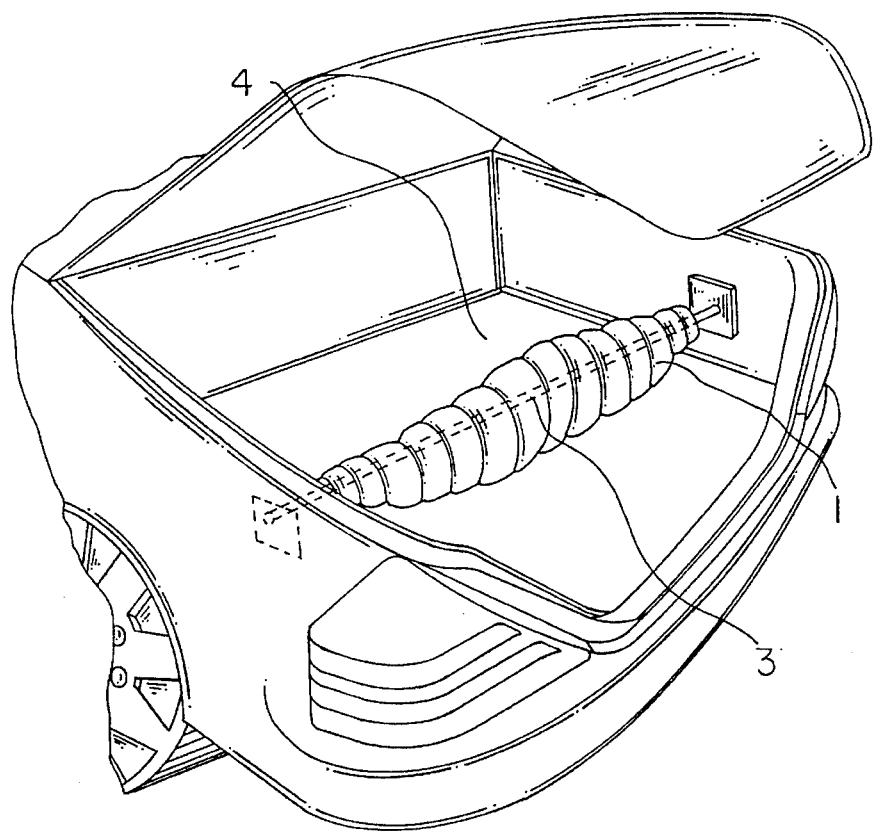
FIG. 3 is a partial cut-away view of an automobile trunk with the system installed and the automobile cover in the stored condition

The present invention more specifically concerns an improved automobile cover deployment and storage system which, in a preferred embodiment, provides an elongated, flexible automobile cover which is secured at its rear end to a spring means biased roller mounted in the trunk compartment of an automobile. The cover may be conveniently stored in a rolled condition, and rapidly deployed simply by opening the trunk, pulling the cover backward out and over the trunk, closing the trunk part way, and pulling the cover forward over the automobile, using the trunk lid to help evenly feed out the cover. As the cover is pulled forward over the automobile, the spring means inside or associated with the roller assembly is slowly wound tighter. The cover is then draped over, and removably secured to the front of the automobile by hook, VELCRO (hook-and-pile fastener), elastic, or other conventional means.

Any loose portions of the cover, such as the rearward edges of the side cover section, can be VELCRO (hook-and-pile fastener) fastened to provide a tight fit. For example, the rear corners of the side covers can be attached to mating portions of the section of automobile cover covering the rear trunk panel by VELCRO (hook-and-pile fastener) means to provide a tight and secure fitting.

Thereby, essentially the entire upper surface and side surface portion of the automobile can be covered and protected.

In a preferred embodiment, the cover is provided with cut-outs corresponding to the trunk locking mechanism and the trunk keyhole. Thus, the trunk can be easily locked and unlocked with the cover deployed over the automobile.

When the cover is fully drawn off the roller assembly and deployed over the automobile, the spring means has been wound and contains sufficient elastic resiliency to rewind the cover back onto the roller assembly after the cover has been released from the front of the automobile.

More specifically, in the case of a roller being provided about a fixed axle, rotation of the roller will result in the automobile cover being wound or unwound around the axle. The auto cover is fully wrapped about the tubular roller with the spring near or in the unwound (relaxed) disposition. As the cover is drawn with tension from the roller, the rotation of the roller relative to the fixed axle winds the spring and creates a restoring torsional force that urges the roller to tend to counter-rotate and rewind the cover about the reel.

The invention further concerns a simple system for mounting the housingless spring tensioned roller assembly in the trunk of an automobile. The mounting hardware essentially comprises end plates which can be mounted inside the trunk of the automobile, preferably flush with the side walls of the trunk compartment, more preferably hidden behind any trunk lining so as to be essentially invisible except for exposed receiving means for receiving the roller assembly.

The precise configuration of the end plates or mounting hardware is not critical, and end plates may be individually tailored to the contours of the trunk of a particular automobile, or may simply be a standard six by six inch square sheet of plywood having a metal receiving means mounted thereon. The end plate is provided with receiving means, such as a socket, having holes or other receptacles for either fixedly mounting the axle in the case that a roller is mounted rotatably about an axle, or to receive and journal the pivot axles in a freely rotating fashion, in the case that the roller is fixed to the axles, so that the roller member may rotate freely. The mounting means is designed so as to provide the roller assembly with freedom to rotate about an axis. Preferably, the axial protrusions of the roller assembly have a diametrically opposed pair of outwardly extending rotary pins, and the mounting means include pin holes or slots adapted for reception of the rotary pins. For example, in the case that the roller is fixed to an axle intended to be rotatingly mounted, the rotary pins, once positioned within the pin holes, enable the roller assembly to be rotated. Within each of the pin holes is positioned a spring which is compressed when the rotary pin moves vertically deeper within a pin hole. Alternatively, in the case that the axle is intended to be non-rotatingly yet removably mounted to the mounting means, the mounting means are provided with a slot shaped receptacle adapted to receive a flat end provided at at least one end of the axle.

The deployable and retrievable cover system of the present invention can be visualized with analogy to the known roller-type window shades, including a ratchet and pawl mechanism by which the return torsional force can be controllably arrested and resumed by tugging on the cover. It will be understood that the mounting hardware, spring means and roller assembly construction are engineered for greater loads.

The spring means may be of any construction capable of storing tension or torsional energy as return energy, for example, in the manner of window shades. The roller is mounted on or provided with a member capable of storing torsional energy whereby the roller will aid in the rewinding of the cover due to the tendency of the roller to rotate under the influence of the member capable of storing torsional energy.

The spring means may, for example, be a spiral wound, constant force spring, wound concentrically about the axis of the axle, and having an inner end mated to the roller (or to the axle in the case that the roller is fixed to the axle and the axle is a pivot axle), and an outer end fixedly attached to the end plate, as disclosed in U.S. Pat. No. 4,732,421. A shield may be provided about the spring to prevent entanglement of the cover with the spring during deployment and retrieval of the cover.

The member capable of storing torsional energy more preferably comprises a metal spring member in the shape of a helical coil, coiled about the axis of a fixed axle and provided interior of a roller pivotally mounted coaxially about the fixed axle, with one end of the spring fixed to the axle and the other end fixed to the roller. The member capable of storing torsional energy is preferably a spring, which spring is preferably in the shape of a metal helical coil which can be provided about the central axis of the axle and internal of the roller. The spring means may be made of any suitable resilient material, and is preferably made of metal, but may be any other spring means such an elastic cord wrapped about the axle. For example, in a less preferred embodiment of the invention, one end of a bungee type elastic cord is attached to the automobile, and the other end is attached to a spool which is coaxial with the axle, rotatable about the axle, and fixedly mounted to the roller.

Preferably the roller assembly includes an outer roller, an inner axle, and at least one spring disposed about the inner axle and between the inner axle and the outer roller. The interconnecting spring is attached by one end to the axle and by the other end to the roller. Although it is possible to use more than one spring, one spring is entirely adequate.

In one embodiment, the axle extends beyond the ends of the roller on each end, the protruding ends of the axle are fixed to the mounting hardware, and the roller is rotatably mounted to the axle.

In an alternative embodiment, a first end of the roller is capped with a cap having a protrusion along the central axis of the roller, which protrusion is adapted to be received by the automobile mounting hardware, i.e., the end plates. A first end of an axle is inserted into the roller and is received by a socket in the core of the roller. The second end of the axle protrudes from the second end of the roller and is mounted to the mounting hardware on the automobile. The axle is fixed to the second end plate. The roller is rotatably mounted about the axle, and is pivotally engaged to the end of the axle by means of the socket, and to the first end plate by means of the protrusion along the central axis.

In yet a further alternative embodiment, the roller is fixed to the axle, and the axle is pivotally mounted on both ends to the end plates.

These and numerous other roller and spring constructions can be used within the contemplation of the inventor.

A great advantage of the system according to the invention is in the fact that the spring biased roller is immediately and completely responsive to the operator, so that as the cover is released from the front of the automobile, it is immediately taken up by the roller at the same rate as it is fed to the roller. An electric motor driven roller, on the other hand, would require the operator to disengage the cover from the front of the automobile, walk to the trunk, turn on the electric motor, turn off the motor every time the cover is snagged by the automobile, walk to the front of the automobile, unsnag the cover, walk to the trunk, engage the electric motor, etc. It would not be possible for a single operator to unhook a automobile cover from the front of a automobile and raise the cover over obstacles such as an antenna or automobile rack and to have the cover taken up by the roller.

The automobile cover may be fabricated of any material conventionally employed in the art, such as textile materials, synthetic polymers, glass fiber, or other suitable materials. The material is preferably UV and water impermeable. Furthermore, the cover may comprise an elastic material or may have an elastic or memory material, e.g., springs or rubber, incorporated therein.

The cover may be comprised of a flexible fabric of nylon, for example, having a shape to overlay the roof, front, rear and side portions of the automobile. The cover has leading and trailing edges. The leading edge of the cover preferably has a front section of an elastic or partially elastic fabric, and is adapted to be secured to the front bumper region of the automobile. The side and trailing edges of the cover may include a ribbon or band of elastic material sewn around the perimeter thereof to provide for a snug fit around the sides of the automobile, and optionally lower regions of the rear bumper and side fenders.

One end of the protective cover is attached to the roller member by adhesive means or releasable coupling means such as snap fasteners, VELCRO (hook-and-pile fastener), or a pair of straps. The straps may have one end wound on the axle and a second end that is releasably connected to the cover. Preferably, the releasable coupling means comprises VELCRO (hook-and-pile fastener) on the strap and the end of the cover.

The cover may be held onto the body of the automobile by any suitable means conventionally employed in the art, such as hooks, VELCRO (hook-and-pile fastener) fasteners, loops, straps, etc. For ease of deployment and storage, it is preferred that the front part of the automobile cover be provided with elastic means for securing the cover over the front bumper of the automobile.

The elasticized front section at the leading edge of the cover may include a cut-out portion to fit around the license plate and/or bracket at the front bumper in order to provide a convenient attachment scheme.

In a variation of the present invention, the cover may be provided with a separate piece of fabric which can be grasped and pulled rearwardly to cover the rear bumper of the automobile. When this rear portion is so fitted, the elasticized border portions at the side edges of the cover simultaneously move downwardly to slip beneath the bottom edges of the fenders along the sides of the automobile providing a very snug and attractive appearance.

The present invention will now be discussed with respect to the drawings. In one form of the present invention, there is provided a self-contained, lightweight, spring driven rewinding and storing apparatus for a flexible protective cover for an automobile which comprises a centrally located rotatable axle mounted with opposite ends of the axle abutting opposite sides of the automobile trunk. One end of the axle unit is adapted for receiving one end of a spring, and the other end of the spring is engaged with the rotating tube.

Referring now to FIG. 1, this figure illustrates the first step of covering an automobile with the cover of the present invention, which cover is indicated generally by reference numeral 1. Cover 1 is in a fully extended position over the top of automobile 2 and secured over the front bumper of the automobile by elastic means incorporated into the material. FIG. 2 shows cover 1 drawn over the sides of the automobile, and fastened in the back by means of VELCRO hook-and-pile fastener along seam 25.

FIG. 3 shows cover 1 in the stored condition, wrapped around roller assembly 3. Roller assembly 3 is mounted in the trunk 4 of the automobile 2 by means of mounting hardware comprising receptacle means comprising machined receptacles 6 and 9, metal flanges or mounting plates 17 and 20, and end plates 5 preferably constructed of wood. Receptacles 6 and 9 and mounting plates 17 and 20 may be machined from a single piece of metal stock, such as aluminum stock, but are preferably comprised of two separate elements welded together. Metal mounting plates 17 and 20 are then bolted to wooden end plates 5 for mounting to the automobile 2.

Figure 4:
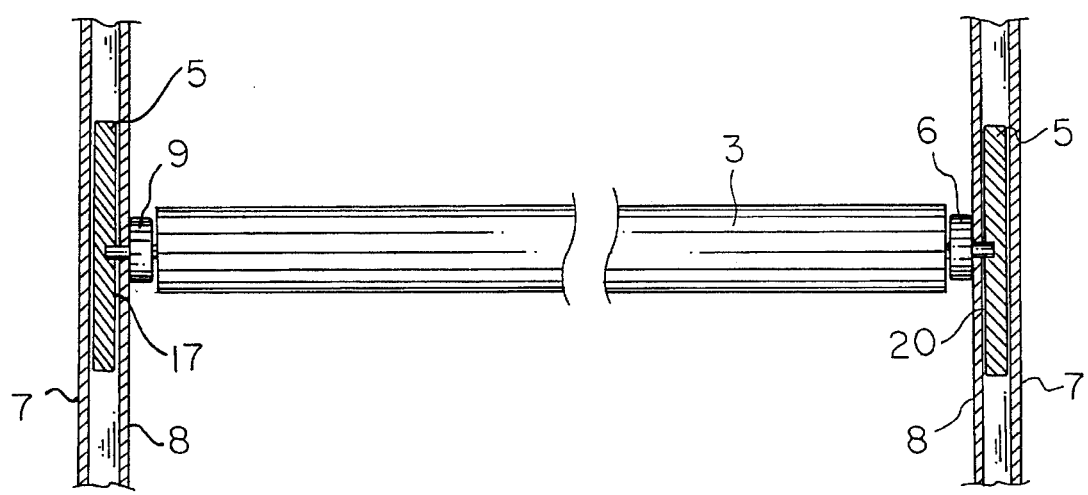
FIG. 4 is a top cross-sectional view along the axis of the roller means, showing automobile trunk walls, mounting hardware, and roller assembly

As shown in FIG. 4, the end plates 5 and mounting plates 17 and 20 are preferably disposed out of view between automobile wall 7 and trunk liner 8.

Figure 5A:
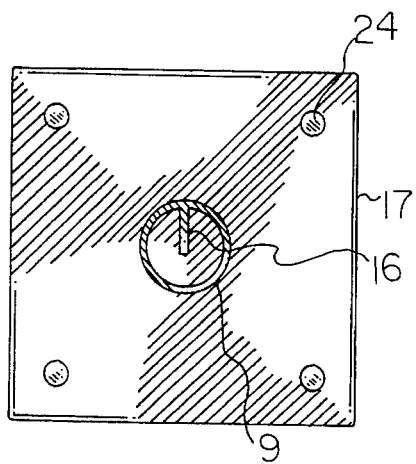
FIGS. 5a and 5b show the end plates
Figure 5B:
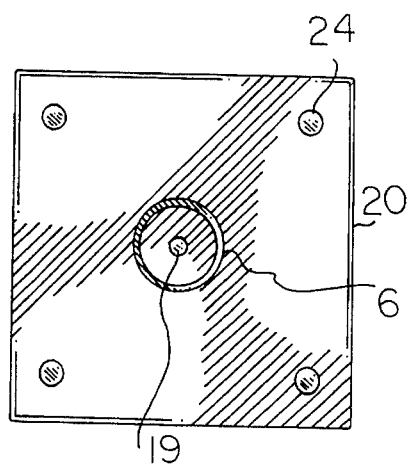
Figure 6:
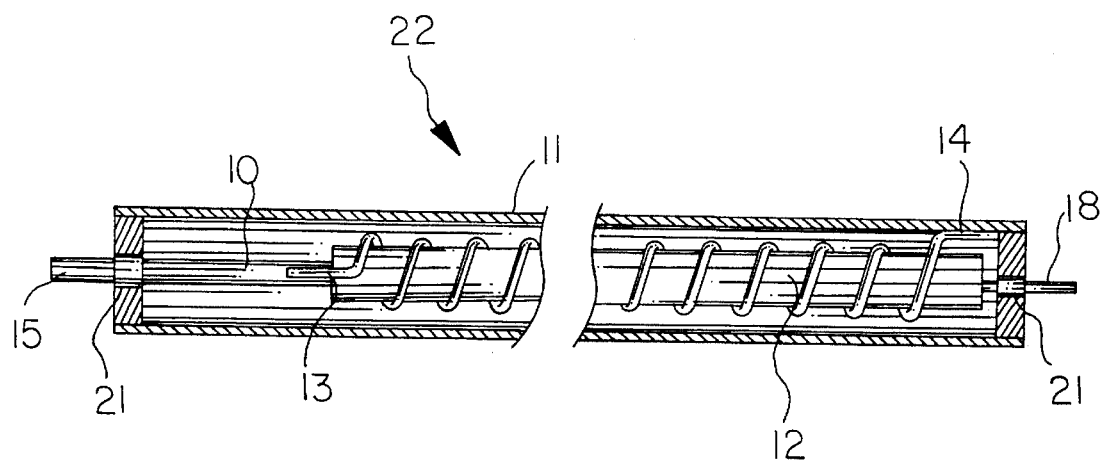
FIG. 6 is a partial cutaway view of the roller assembly showing the axle, roller and spring means

FIGS. 5a, 5b and 6 show a preferred embodiment of the invention. In this embodiment the roller assembly 22 comprises an axle 10, a roller 11 mounted rotatably about and coaxially with the axle, and a metal spring 12 fixed at one end 13 to axle 10 and at the other end 14 to roller 11. One end 15 of axle 10 is tab shaped, and tailored to removably fit snugly into non-rotating slot 16 in receptacle 9. The other end of axle 10 is in the form of a pin 18 which can be inserted into a hole 19 in receptacle 6. Receptacles 9 and 6 are welded to mounting plates 17 and 20 and mounted to end plates 5 in a conventional manner, such as by bolts (not shown). End plates 5 are, in turn, placed between trunk wall 7 and trunk line 8 or fixed to the automobile trunk wall 7 by adhesive means, by bolting, or by being manufactured in a shape which conforms to a recess in the structural panels of the automobile and thus remains naturally disposed in the trunk without any additional fixing means, or with only a minor amount of an adhesive.

Roller 11 is mounted on axle 10 by means of bearings 21 which may be slippery silicon-plastic washers, metal ball bearing means, or any conventional bearing or journaling means which permit roller 11 to rotate freely about the axis of axle 10.

To install, holes the size of the receptacles 6 and 9 are first cut into trunk liner 8 where it is desired to install the system of the present invention. End plates 5 and mounting plates 17 and 20 are installed between automobile body 7 and trunk liner 8, with only receptacles 6 and 9 exposed. Roller assembly 22, with cover 1 wrapped around roller assembly 22, is then simply installed by inserting pin 18 into hole 19, and then sliding tab 15 into slot 16. The system is now ready for use.

In operation, as cover 1 is deployed by being pulled from roller assembly 22, so that roller 11 rotates, causing spring 12 to twist and store torsional energy. To wind cover 1 back onto the roller assembly 22 for storage, cover 1 is simply unhooked from the front of automobile 2 and walked back to the rear of automobile 2, making use of the torsional energy stored in spring 12 to cause roller 11 to wind cover 1 about it's circumference.

In a preferred embodiment of the invention, for coverage of the entire automobile 2, cover 1 is comprised of two sections, the first being tailored for deployment about the trunk and forward over automobile 2, the second being a "shirt-tail", a smaller flap for extending out of the trunk and downward over the rear bumper. To secure the cover 1, the two sections of cover 1 are united by VELCRO hook-and-pile fastener means or other means along seam 25.

When cover 1 is fully wound about roller assembly 22, cover 1 and roller assembly 22 may be removed from the operating position in the trunk to a storage location in the trunk or may be completely removed from automobile 2 simply by sliding tab 15 out of slot 16 and pulling pin 18 out of hole 19.

The present invention thus provides an improved lightweight, easily installed and deployed, spring driven rewinding and storing system for a flexible protective cover for an automobile which overcomes the disadvantages of the prior art. The automobile cover deployment and storage system of the present invention provides a quick and easy means for the automobile owner to deploy and retrieve the automobile cover, thereby increasing the likelihood that the automobile cover will actually be deployed and provide the desired protection against theft and the elements. Contrary to many prior art automobile cover deployment systems, the present system is able to provide the desired capability of quick and easy deployment and removal of the automobile cover, with a concomitant improvement of the aesthetic appearance of the covered automobile, particularly in comparison with most conventional automobile cover systems discussed above.

Although the system was first designed for providing shielding for an automobile, and thus is particularly suited for protecting an automobile against sunshine, rain, dust, etc., it will be readily apparent that the system is capable of application to related vehicles, such as boats, and is thus capable of use in a number of other applications. Although this invention has been described in its preferred form with a certain degree of particularity with respect to covering of automobiles, it is understood that the present disclosure of the preferred form has been made only by way of example and that numerous changes in the details of structures and the composition of the system may be resorted to without departing from the spirit and scope of the invention.

Now that the invention has been described,

What is claimed is:

1. A system for deploying and retracting a vehicle cover designed for use with a vehicle having a front, a trunk with laterally opposed trunk walls, a trunk liner, a trunk locking mechanism, and a trunk lid movable between opened positions and a closed position wherein said trunk lid is tightly secured against said trunk in said closed position, said system removably mounted in said trunk and comprising an elongated roller assembly, said roller assembly having an inner axle with a longitudinal axis and an outer roller pivotally disposed about said axis, said inner axle being removably placed in a fixed position between said laterally opposed trunk walls during use, said outer roller capable of rotational movement about said longitudinal axis, said inner axle comprising opposite ends, one of said opposite ends being in the form of a pin, the other of said opposite ends being in the form of a slat, and said outer roller having a surface for receiving, winding, and storing said vehicle cover;

said vehicle cover comprising lightweight flexible material and having adequate size to substantially envelop said vehicle, said vehicle cover also having a configuration closely contoured to said vehicle and a cut-out area adapted to fit around said trunk locking mechanism, said vehicle cover having a front end and a back end, said back end being connected to said surface of said outer roller, said vehicle cover capable of movement between a deployed position and a retracted position, said front end engaging said front of said vehicle when said vehicle cover is in said deployed position, said vehicle cover being compactly wrapped around said outer roller when in said retracted position;

connection means to connect said vehicle cover to said roller assembly;

spring means connected to said roller assembly and having opposite ends, said spring means capable of storing torsional energy as said vehicle cover is moved into said deployed position, said torsional energy being conserved in said spring means for use in retracting said vehicle cover by said trunk lid engaging and securely holding said vehicle cover while said trunk lid is in said closed position, one of said opposite ends of said spring means being attached to said axle and the other of said opposite ends being attached to said outer roller so that deployment of said vehicle cover causes said outer roller to rotate relative to said axle thereby causing said spring means to store said torsional energy; and mounting means to removably mount said roller assembly between said laterally opposed trunk walls in said trunk so that after said front end of said vehicle cover is removed from said front of said vehicle and said trunk lid is opened, said vehicle cover is retracted directly, neatly, compactly, and automatically into said trunk, said mounting means comprising a plurality of end plates, and a plurality of mounting plates, at least one of said end plates being disposed between said trunk liner and each of said laterally opposed trunk walls, said mounting plates being disposed between said trunk liner and said end plates, said mounting plates attached to said end plates, said inner axle being connected between said mounting plates, one of said mounting plates comprising a hole for releasably receiving said pin-shaped end of said inner axle, another of said mounting plates comprising a slot-shaped receptacle for releasably receiving said slat-shaped end of said inner axle securely against rotation, and said mounting means capable of securing said roller assembly in said trunk without permanent modification to said laterally opposed trunk walls.

\* \* \* \* \*